(12) United States Patent
Cole et al.

(10) Patent No.: US 6,425,508 B1
(45) Date of Patent: Jul. 30, 2002

(54) SPORTS EQUIPMENT RACK FOR A VEHICLE

(75) Inventors: Stephen J. Cole, Arcata; Lyle R. Hilk, Eureka, both of CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/607,787

(22) Filed: Jun. 30, 2000

(51) Int. Cl.[7] .................................................. B60R 9/00
(52) U.S. Cl. ..................... 224/320; 224/321; 224/324; 224/325; 224/330; 224/495
(58) Field of Search ................................ 224/320, 321, 224/328, 330, 405, 494, 495, 309, 324, 314, 325

(56) References Cited

U.S. PATENT DOCUMENTS

| | | | | |
|---|---|---|---|---|
| 3,002,664 A | * | 10/1961 | Guevara | 224/320 X |
| 3,061,256 A | * | 10/1962 | Feinstein et al. | 224/324 X |
| 3,581,962 A | * | 6/1971 | Osborn | 224/324 X |
| 3,722,765 A | * | 3/1973 | Binding | 224/320 |
| 3,951,320 A | | 4/1976 | Bott | |
| 4,483,471 A | * | 11/1984 | Prosen | 224/314 |
| 5,009,337 A | * | 4/1991 | Bimbi | 224/320 X |
| 5,236,114 A | | 8/1993 | Bergquist | |

OTHER PUBLICATIONS

Thule catalog, Thule Inc., pp. 24–25, 1997.
Thule catalog, Thule Inc., pp. 24–27, 1998.
Thule catalog, Thule Inc., pp. 32–34, 1999.
Thule catalog, Thule Inc., pp. 4, 29–31, and 33–34, 2000.

* cited by examiner

*Primary Examiner*—Gregory M. Vidovich
*Assistant Examiner*—Maerena W. Brevard
(74) *Attorney, Agent, or Firm*—Kolisch Hartwell Dickinson McCormack & Heuser

(57) ABSTRACT

A load-bearing frame assembly for coupling to a roof of a vehicle is provided. The load-bearing frame assembly comprises a front frame section adapted to be coupled to the vehicle roof toward the front of the vehicle roof, a rear frame section adapted to be coupled to the vehicle roof toward the rear of the vehicle roof, and a frame extension section adapted to be coupled to the roof of the vehicle between the front frame section and the rear frame section. The front frame section includes a first connector and a first load bar for supporting a sports equipment mount. The rear frame section includes a second connector complementary to the first connector so that the rear frame section is joinable to the front frame section to form a first, smaller load bearing frame. The frame extension section is adapted to be coupled to the roof of the vehicle between the front and the rear frame section to form a second, larger load-bearing frame. The rack also includes a second load bar for supporting a sports equipment mount movably coupled to one of the front frame section, the rear frame section or the frame extension section such that the position of the second load bar relative to the first load bar is adjustable.

20 Claims, 3 Drawing Sheets

SPORTS EQUIPMENT RACK FOR A VEHICLE

The present invention relates to a sports equipment rack for mounting sports equipment to the exterior of a vehicle. More particularly, the invention provides an extendable cargo cage-type sports equipment rack with a positionally adjustable load bar that offers improved resistance to corrosion.

BACKGROUND OF THE INVENTION

Sports equipment racks for mounting sports equipment to the exterior of vehicles are becoming increasingly adaptable. Many racks now allow a variety of accessories, such as various mounts adapted for securing particular items of sports equipment, to be selectively attached to or removed from the rack so a user can customize the rack for a desired use. These racks typically include a pair of load bars mounted across the vehicle at a suitable location, such as the vehicle roof, to which accessories for securing sports equipment to the rack may be attached.

One type of accessory is a cargo cage rack. Cargo cage racks are basket- or cage-like structures that are adapted for carrying bulk cargo items. They generally include a floor structure, and a side structure that extends around the perimeter of the floor structure vertically above the floor structure. The side structure sometimes takes the form of front, back and side rails. Cargo can be placed on the floor structure, and is prevented from falling out of the cage by the side structure. Though cargo cage racks are available as accessories for many rack systems, they also may be mounted directly to a vehicle roof.

When a cargo cage rack is mounted as an accessory to the load bars of another sports equipment rack, it often substantially covers the underlying load bars. This may limit a user's ability to mount other types of sports equipment mounts to the load bars. To avoid this limitation, the front and back rails of the cage may be formed from members with an identical circumference and cross-sectional shape as the underlying load bars. This allows any sports equipment mounts designed for attachment to the underlying load bars to be attached to the front and back rails of the cargo cage. In other words, the front and back rails of the cargo cage may themselves be load bars.

Generally, the size of a cargo cage rack that has front and rear load bars may be restricted by considerations involving the types of sports equipment to be mounted to the load bars. For example, if the load bars are spaced too far apart, the distance between the bars may be too long to mount a bicycle with ordinary bicycle mounts. However, if the load bars are too close together, the cargo cage rack may be too small for some cargo loads.

To solve the problem of carrying capacity, extension pieces are available for some cargo cage racks that increase the size of the cage. However, the use of an extension may position the front and back load bars of the cargo cage rack too far apart for mounting some articles of sports equipment. Furthermore, locations must be provided on the cargo cage rack for attaching the extension. Because the cargo cages are often made from tubular metal, these attachment points may provide locations at which moisture can get inside of the tubular metal of the cargo cage rack frame, possibly increasing the susceptibility of the rack to corrosion.

BRIEF DESCRIPTION OF THE DRAWINGS

FIG. 6 is an enlarged view taken from the area defined by line 6 of FIG. 1.

DETAILED DESCRIPTION OF THE PREFERRED EMBODIMENTS

Figure 1:
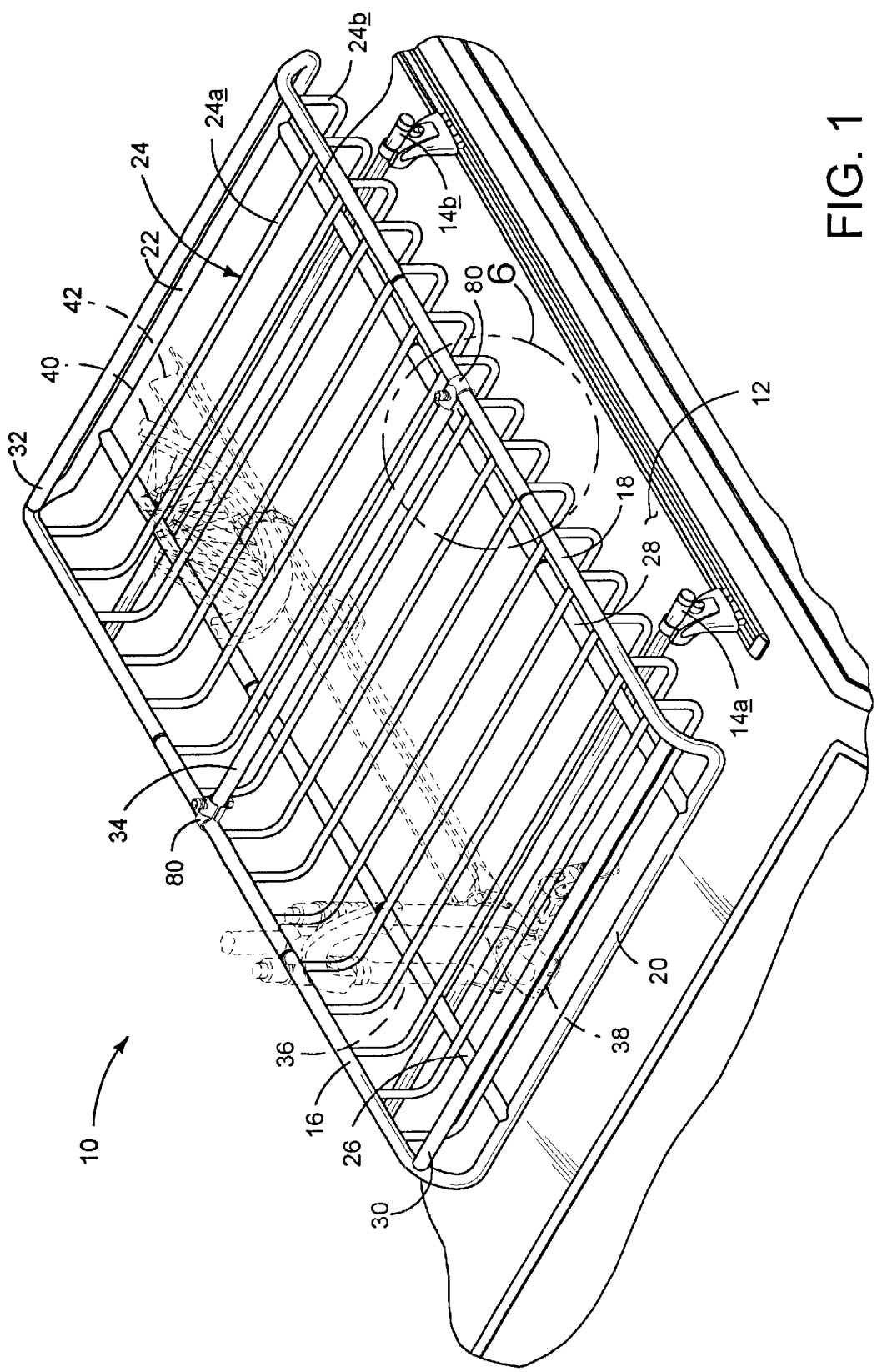
FIG. 1 is an isometric view of a sports equipment rack according to a first embodiment of the present invention.

The present invention provides a load-bearing frame assembly in the form of an extendable cargo cage-type sports equipment rack that includes a positionally adjustable load bar and offers improved resistance to corrosion. One embodiment of the present invention is shown generally at 10 in FIG. 1. Cargo cage rack 10 is mounted to a pair of crossbars 12a, b that are, in turn, mounted to a vehicle roof 14. Rack 10 includes a first elongate side member 16 and a second elongate side member 18 that define first and second sides of rack 10, respectively. First elongate side member 16 and second elongate side member 18 each extend generally in a direction from the front of roof 14 toward the rear of roof 14. Rack 10 also includes a front rail 20 and a back rail 22 that define the front and back of rack 10, respectively. A floor structure formed from a plurality of floor members 24 extends between first elongate side member 16 and second elongate side member 18 along the length of rack 10. Floor members 24 are at least partially supported by a first elongate floor support 26 and a second elongate floor support 28. First and second elongate floor supports 26 and 28 each extend between front rail 20 and back rail 22, preferably in a generally parallel relation to first and second elongate members 16 and 18. Though floor members 24 may have any desired shape and structure, in the depicted embodiment each floor member 24 has a U-shaped structure, with a long, generally straight center portion 24a and short upturned ends 24b. This gives the floor of rack 10 enough depth to prevent cargo held within rack 10 from sliding out of the sides of the rack. Generally, the floor of rack 10, defined by straight portions 24a of floor members 24, is positioned between 4 and 9 inches below the uppermost portion of elongate side members 16 and 18, and preferably between 5 and 7 inches below the elongate side members. Although rack 10 is shown in FIG. 1 as an accessory that is mounted to a separate pair of crossbars, rack 10 may also be mounted directly to the roof of a vehicle via conventional methods.

Rack 10 has the capability of simultaneously carrying both bulk cargo and particular items of sports equipment that require specialized mounts. Bulk cargo may be carried on rack 10 simply by placing the cargo within the cage formed by rack 10. If desired, the cargo may be tied into rack 10, using floor members 24, first or second elongate side members 16 and 18, or any other part of rack 10 as tie-down locations.

Sports equipment may be carried on rack 10 by attaching compatible sports equipment mounts to the rack. To provide locations for the attachment of these sports equipment mounts, rack 10 includes a front load bar 30, a rear load bar 32, and an adjustable intermediate load bar 34. Front load bar 30, rear load bar 32 and intermediate load bar 34 are configured to support the weight of articles of sports equipment, and to be compatible with standard sports equipment mounts so that the mounts may be easily attached to and removed from the load bars. Thus, front load bar 30, rear load bar 32 and intermediate load bar 34 typically have the same outer diameter as crossbars 14a and 14b. In one embodiment of the invention, front and back rails 20 and 22, elongate side members 16 and 18, and elongate floor supports 26 and 28 also have the same diameter as crossbars 14a and 14b, though they may have other diameters as well.

FIG. 1 shows a bicycle attached to front load bar 30 and intermediate load bar 34. The forks 36 of the bicycle, shown in dashed lines, are coupled to a fork mount 38 that is mounted to front load bar 30. Similarly, the rear wheel of the bicycle 40 is coupled to intermediate load bar 34 via a rear wheel mount 42 mounted to intermediate load bar 34. The position of intermediate load bar 34 is adjustable so that intermediate load bar 34 may be moved to an optimal location for mounting a particular item of sports equipment. Alternatively, either front load bar 30 or rear load bar 32 may be positionally adjustable instead of, or in addition to, intermediate load bar 34.

Front and rear load bars 30 and 32 may be positioned at any desired location on rack 10. In the depicted embodiment, front load bar 30 is positioned adjacent the front end of rack 10, and rear load bar 32 is positioned adjacent the rear end of rack 10. Furthermore, in the depicted embodiments, front and rear load bars 30 and 32 are positioned vertically above floor members 24 so that they help prevent any cargo in rack 10 from sliding out the front or back of rack 10, respectively. Alternatively, front and rear load bars 30 and 32 may be positioned even with or below floor members 24 if desired.

Besides serving as an attachment point for sports equipment mounts, intermediate load bar 34 also may be used to divide the cargo area of rack 10 into smaller sections. This may be desirable when the cage is not filled to capacity to reduce the tendency of cargo to shift with changes in vehicle speed or direction.

The structural components of rack 10 may be made of any suitable material. One example of a suitable material is 0.080" walled 0.90" inner diameter tubular steel. The steel may be treated with a suitable coating, such as a powder or paint coating, to prevent the oxidation of the steel. Alternatively, tubing of other sizes or shapes may be used without departing from the scope of the present invention, and tubing of different sizes and shapes may be used for different components on the same rack. Furthermore, the structural components of rack 10 may be made from solid tubing if desired, and from materials other than steel.

Figure 2:
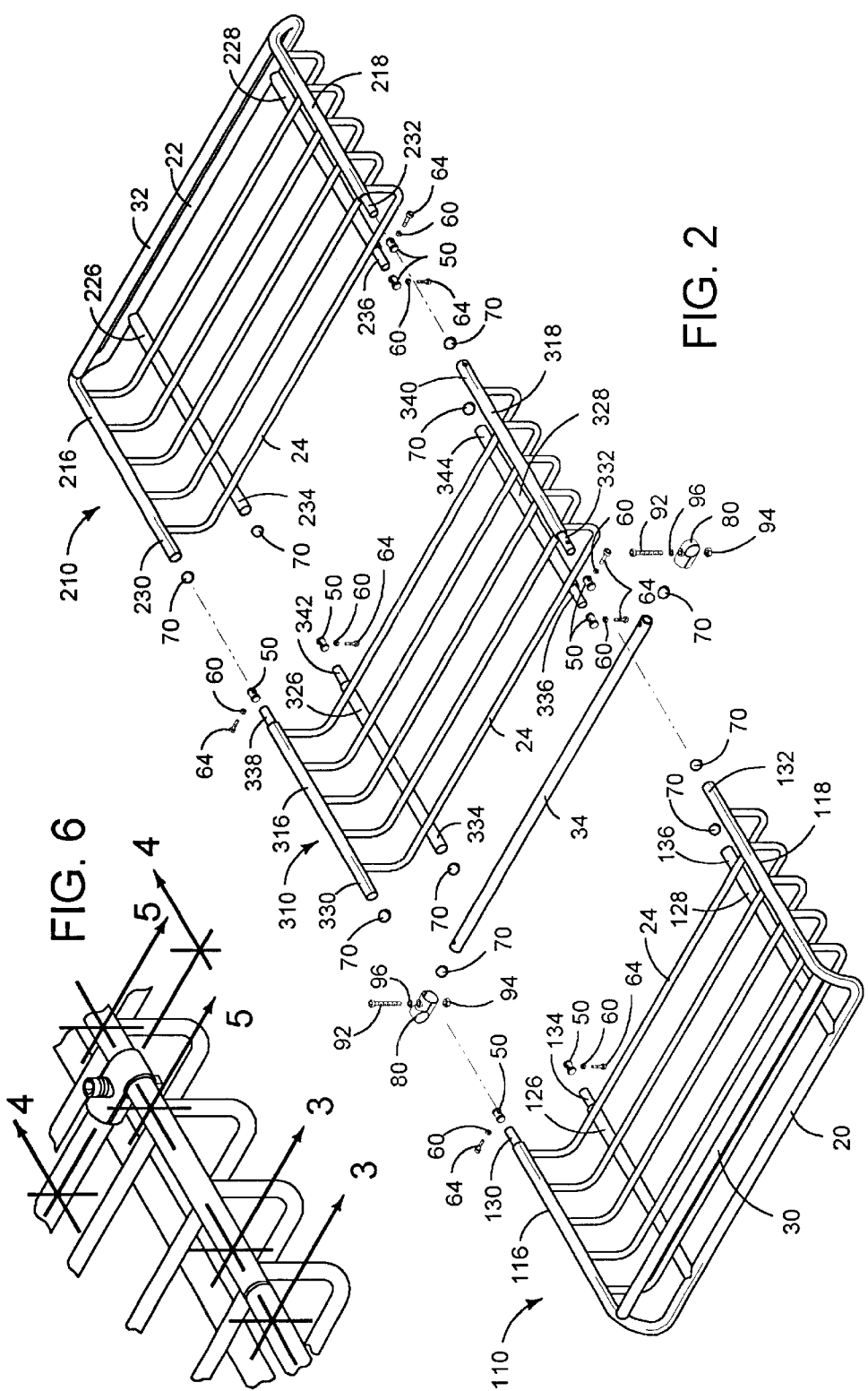
FIG. 2 is an exploded isometric view of the embodiment of FIG. 1.

The size of rack 10 is adjustable so that the cargo carrying capacity of rack 10 may be tailored for particular load sizes. To provide for this capability, rack 10 is formed from a plurality of separate sections. A user may join as many or as few sections as desired together to form a desired cage size. Referring to FIG. 2, the depicted embodiment is formed from three sections: a front section 110, a rear section 210 and an extension section 310. Each separate rack section 110, 210 and 310 includes structural sub-members that may be joined with structural sub-members on adjacent rack sections to form first elongate side member 16, second elongate side member 18, first elongate floor support member 26 and second elongate floor support member 28.

Front section 110 includes front rail 20, front load bar 30, and a plurality of floor members 24. In the depicted embodiment, front section 110 is shown to have five floor members 24, though it may have either more or fewer floor members 24, depending upon the size of front section 110 and the spacing desired between individual floor members 24.

The sides of front section 110 are formed from a first side sub-member 116 and a second side sub-member 118. First side sub-member 116 and second side sub-member 118 extend from the front of front section 110 toward the rear of vehicle roof 14 in a generally parallel relation to one another. First and second side sub-members 116 and 118 are each joined at one end to front rail 20, and are configured to be joined to the side sub-members of other rack sections to form first and second elongate side members 16 and 18.

Similarly, floor members 24 of front section 110 are at least partially supported by a first floor support sub-member 126 and a second floor support sub-member 128. Like first and second side sub-members 116 and 118, first and second floor support sub-members 126 and 128 extend in a generally parallel relation to one another in a direction from the front toward the back of vehicle roof 14. First and second floor support sub-members 126 and 128 are joined at one end to front rail 20, and at the other end are configured to be coupled with floor support sub-members on other rack pieces to form first and second elongate floor support members 26 and 28.

Front section 110 also includes one or more connectors configured to join front section 110 to another rack section. Any suitable connector may be used to couple these sections together. In the depicted embodiment, first side sub-member 116 has a first male connector 130. First male connector 130 is formed from a narrowed region of the tubular metal forming the sub-member, and is configured to be coupled to a complementary female connector on an adjacent rack section. Similarly, second side sub-member 118 has a first female connector 132 formed in the end of second side sub-member 118 opposite front rail 20. First female connector 132 is formed from a region of the tubular metal forming second side sub-member 118, and is configured to accept a complementary male connector. Furthermore, first floor support sub-member 126 has a second male connector 134 similar to first male connector 130, and second floor support sub-member 128 has a second female connector 136 similar to first female connector 132.

In the depicted embodiment, front section 110 may be coupled directly to rear section 210 without the use of extension section 310, or may be coupled to extension section 310. When front section 110 is coupled directly to rear section 210, a first, smaller cargo frame or cage is formed. In this configuration, sports equipment mounts, such as a bicycle mount, may be attached to front load bar 30 and rear load bar 32 without the use of intermediate load bar 34.

Rear section 210 is configured to be structurally complementary to front section 110, allowing it to be coupled directly to front section 110 to form the first, smaller load carrying cage. Rear section 210 includes a first side sub-member 216 and a second side sub-member 218. First and second side sub-members 216 and 218 are joined to back rail 22 at one end, and extend toward the front of the car in a generally parallel relation to one another, complementary to first and second side sub-members 116 and 118 on front section 110. Rear section 210 also includes a first floor support sub-member 226 and a second floor support sub-member 228 for supporting a plurality of floor members 24 disposed between first and second side sub-members 216 and 218. Though the depicted embodiment has five floor members 24, rear section 210 may have either more or fewer floor members 24, depending upon the size of rear section 210 and the spacing desired between floor members 24. First and second floor support sub-members 226 and 228 extend from back rail 22 toward the front of vehicle roof 14 in a generally parallel relation to first and second side sub-members 216 and 218, and complementary to sub-members 126 and 128 on front section 110.

The first, smaller cage formed by joining front section 110 and rear section 210 together may be any desired size. For a cage configured to fit on an ordinary car roof for carrying both bulk cargo and a bicycle mounted between front load bar 30 and rear load bar 32, an example of a suitable size is approximately 44" long by 39" wide. However, it is to be understood that these are only example dimensions, and that dimensions other than these may also be used without departing from the scope of the present invention.

Rear section 210 has at least one connector complementary to at least one of the connectors on front section 110 to allow rear section 210 and front section 110 to be joined together. In the depicted embodiment, rear section 210 has a plurality of connectors for joining rear section 210 to front section 110. First side sub-member 216 on rear section 210 has a first female connector 230 complementary to first male connector 130 on front section 110, and second side sub-member 218 has a first male connector 232 complementary to first female connector 132 on front section 110. Similarly, first floor support sub-member 226 has a second female connector 234 complementary to first female connector 134 on front section 110, and second floor support sub-member 228 has a second male connector 236 complementary to second female connector 126 on front section 110.

Extension section 310 is configured to be complementary to both front section 110 and rear section 210 so that extension section 310 may be selectively inserted between front section 110 and rear section 210 to form a second, larger load carrying frame or cage, which is shown in FIG. 1. As with front section 110 and rear section 210, the sides of extension section 310 are formed from a first side sub-member 316 and a second side sub-member 318 that extend in a front to back direction along vehicle roof 14. A plurality of floor members 24 are disposed between first and second side members 316 and 318. In the depicted embodiment, extension section 310 has five floor members, but it alternately have either more or fewer floor members 24, again depending upon the amount of separation desired between individual floor members 24 and the size of extension section 310. Floor members 24 are supported by a first floor support sub-member 326 and a second floor support sub-member 328.

To allow extension section 310 to be coupled to front section 110 and rear section 210, extension section 310 has at least one connector complementary to a connector on front section 110 and at least one connector complementary to a connector on rear section 210. In the depicted embodiment, extension section 310 has a connector complementary to each connector on both front section 110 and rear section 210 so that extension section 310 can be coupled securely between front section 110 and rear section 210. Extension piece 310 is joined to front piece 110 with a first female connector 330 configured to be coupled to first male connector 130 on front section 110, a first male connector 332 configured to be coupled to first female connector 132 on front section 110, a second female connector 334 configured to be coupled to second male connector 134 on front section 110, and a second male connector 336 configured to be coupled to second female connector 136 on front section 110.

Similarly, extension section 310 is joined to rear section 210 with a third male connector 338 configured to be coupled to first female connector 230 on rear section 210, a third female connector 340 configured to be coupled to first male connector 232 on rear section 210, a fourth male connector 342 configured to be coupled to second female connector 234 on rear section 210, and a fourth female connector 344 configured to be coupled to second male connector 236 on rear section 210.

By joining front section 110, rear section 210 and extension section 310 in the manner described above, first side sub-members 116, 216 and 316 are joined to form first elongate side member 16, second side sub-members 118, 218 and 318 are joined to form second elongate side member 18, first floor support sub-members 126, 226 and 326 are joined to form first elongate floor support member 26, and second floor support sub-members 128, 228 and 328 are joined to form second elongate floor support member 28.

The second, larger cage formed by coupling extension section 310 between front section 110 and rear section 210 may be any desired size. An example of a typical size is 62" long by 39" wide. At this length, front load bar 30 and rear load bar 32 may be positioned too far apart for some pieces of sports equipment, such as a bicycle, to be mounted between front load bar 30 and rear load bar 32. Thus, intermediate load bar 34 may be positioned at a location between front load bar 30 and rear load bar 32 to support one of the bicycle mounts. Generally, intermediate load bar 34 is positioned on extension section 310, although it may be attached to front section 110 or rear section 210 if desired. It is to be understood that the dimensions given above are only example dimensions, and that dimensions other than these may also be used without departing from the scope of the present invention.

Figure 3:
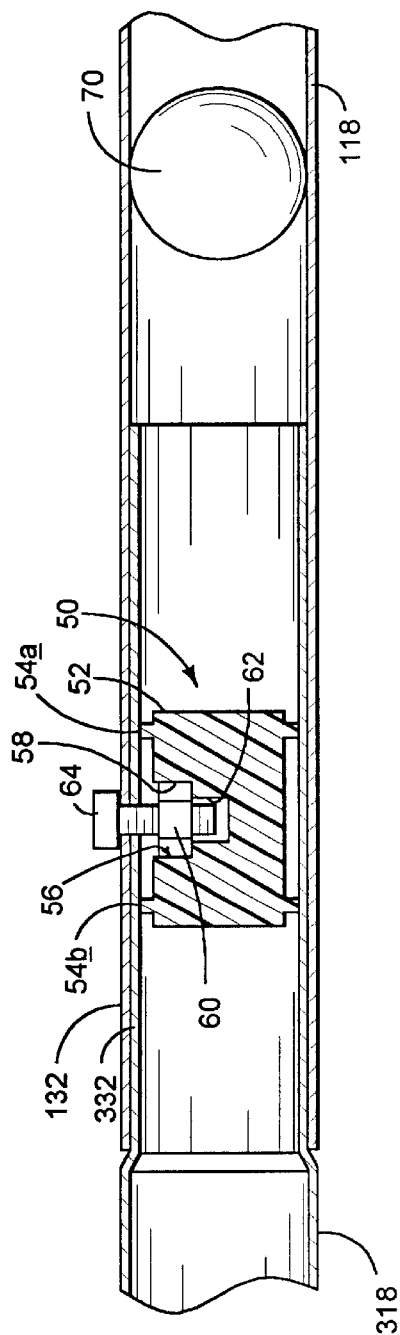
FIG. 3 is a sectional view taken along line 3—3 of FIG. 6.

The multi-section construction of rack 10 allows a user to assemble a cargo cage of more than one size. However, it also presents the opportunity for moisture to enter the tubular metal rack members at the joints between individual rack sections, and possibly cause corrosion of the members from the inside. To lessen the chances of moisture entering any of the tubing, both the male connector and the female connector of each joint may be provided with a moisture barrier. A sectional view of a representative joint, that between second side sub-member 118 of front section 110 and second side sub-member 318 of extension section 310, is shown in FIG. 3. The male connector has a moisture barrier in the form of a securing device 50 disposed within its interior, and the female connector has one in the form of a sealing member 70 disposed within its interior.

Securing device 50 both prevents moisture from entering the tubular metal member at the male connector, and also secures the male and female connectors together. Securing device 50 includes a body 52 configured to fit within the interior of the tube forming the male connector. Body 52 may have any suitable shape that fits within the male connector. For example, the depicted securing device 50 has a cylindrical body 52 that fits within the cylindrical tubing of rack 10.

To seal the inside of the tubing against moisture, securing device 50 also may have one or more contacting portions 54. Contacting portions 54a and 54b are configured to contact the entire inner circumference of male connector 332, thus forming a barrier against moisture. The depicted embodiment has two contacting portions, 54a and 54b, though either more or fewer contacting portions may also be used. Alternatively, body 52 of securing device 50 may itself contact and seal the inner circumference of the male connector, without the use of any contacting portions 54.

Securing device 50 also has the function of holding a nut in place while a bolt is threaded through the nut to hold the male and female connectors together. To accomplish this, body 52 of securing device 50 has an opening 56 formed in one side. Opening 56 has a nut-receiving portion 58 for holding a nut 60, and a bolt-receiving portion 62 for accommodating the end of a bolt 64 that is threaded through the nut. The sides of nut-receiving portion 56 are shaped to fit a desired nut 60 so that the nut is held in place while bolt 64 is threaded through the nut. While the depicted embodiment has only one opening 56 for receiving a nut and bolt, securing device 50 may have more than one opening 56 if it is desired to secure the connectors together with more than one fastener.

With securing device 50, the male and female connectors are held together by tightening nut 60 to clamp the connectors between bolt 64 and nut 60. Thus, there is no need to use sheet metal screws or the like that cut into the sides of the tubing forming the connectors. The use of securing device 50 offers advantages over the use of sheet metal screws. For example, it is generally desirable to coat all surfaces of the tubular steel forming rack 10 with a protective coating to prevent oxidation, including the sides of the holes in the connectors through which bolt 64 passes. If a sheet metal screw that cuts into the sides of the holes were used, the protective coating may be damaged by the screw, exposing the underlying metal to the danger of oxidation. However, with the use of securing device 50, instead of bolt 64 cutting into the sides of the male connector, bolt 64 is held in place by nut 60. Thus, the chances of damaging the protective coating are reduced.

To prevent moisture from entering the structural members of rack 10 that do not have a securing device 50, or to provide additional protection, these members may be fitted with a sealing member, such as plug 70. FIG. 2 shows some of the locations in rack 10 in which plugs 70 may be used, and FIG. 3 shows a typical placement of plug 70 within a female connector. Here, plug 70 is positioned within a female connector at a point just beyond the end of the male connector. Plug 70 may have any suitable shape that will prevent moisture from entering a desired structural member. In the depicted embodiment, plug 70 has a spherical shape to match the shape of the inner circumference of the tubular metal members.

Plug 70 preferably fits tightly within a structural member so that it does not shift positions once it is placed in a desired location. This can be accomplished in a number of ways. For example, a barrier may be formed within the hollow interior of the structural member to prevent plug 70 from moving once it is positioned. In the depicted embodiment, however, plug 70 is formed from an elastomeric material and has a diameter slightly larger than that of the interior of the structural member. Thus, when plug 70 is inserted into the structural member, it is deformed to a small degree. This causes plug 70 to exert pressure against the inner wall of the structural member, sealing the interior of the structural member from moisture and holding plug 70 in place.

Intermediate load bar 34 is an example of a structural member of rack 10 that may be sealed with plug 70. In the depicted embodiment, intermediate load bar 34 is formed from a hollow tubular member similar to those from which first and second elongate side members 16 and 18, and first and second elongate floor support members 26 and 28, are formed. No securing device 50 is used to hold intermediate load bar 34 onto first and second elongate side members 16 and 18, so in the absence of another moisture-blocking mechanism, the interior of intermediate load bar 34 may be susceptible to corrosion caused by moisture. Thus, one or more plugs 70 may be used to seal the interior of intermediate load bar 34. In the depicted embodiment, intermediate load bar 34 has one plug 70 disposed in each end, as shown in FIG. 2.

Figure 5:
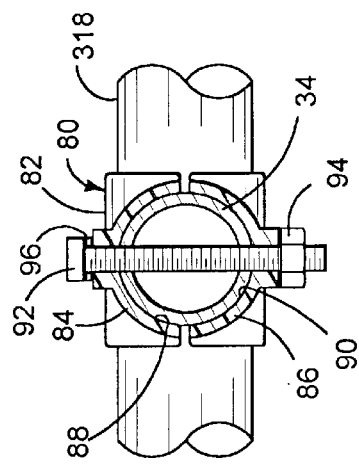
FIG. 5 is a sectional view taken along line 5—5 of FIG. 6.
Figure 4:
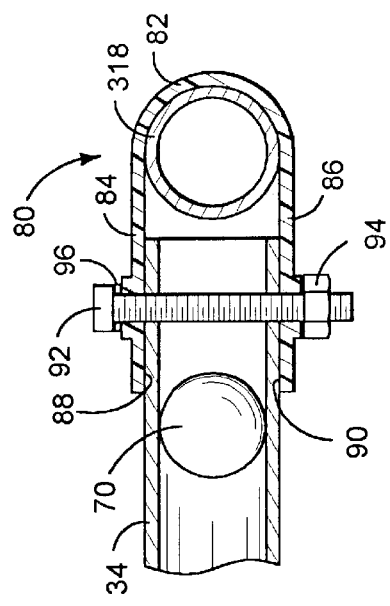
FIG. 4 is a sectional view taken along line 4—4 of FIG. 6.

Intermediate load bar 34 is attached to each of first and second elongate side members 16 and 18 with a suitable fastener that allows intermediate load bar 34 to be selectively moved or fixed along first and second elongate side members 16 and 18. In the depicted embodiment, intermediate load bar 34 is attached to each of first and second elongate members 16 and 18 with a slideable clamp 80. The construction of clamp 80 is shown in more detail in FIGS. 4–5. In the depicted embodiment, clamp 80 is formed from a single U-shaped piece of material, typically plastic. The bottom of the "U" forms a clamping portion 82 that fits around first or second elongate side member 16 or 18. Clamping portion 82 preferably conforms to the shape of first and second elongate side members 16 and 18 so that it can tightly grip a desired elongate side member when clamp 80 is tightened.

In addition to clamping portion 82, clamp 80 has two sides, first side 84 and second side 86, that are configured to extend over the ends of intermediate load bar 34. First side 84 of clamp 80 has a coupling surface 88 shaped to conform to the outside surface of intermediate load bar 34. Similarly, second side 86 of clamp 80 has an opposing coupling surface 90, also shaped to conform to the outside surface of intermediate load bar 34. When clamp 80 is fastened to an end of intermediate load bar 34, the end of intermediate load bar 34 is held between opposing coupling surfaces 88 and 90.

Coupling surfaces 84 and 86 may be fastened to intermediate load bar 34 by any suitable means. In the depicted embodiment, coupling surfaces 84 and 86 are held to intermediate load bar 34 by a bolt 92 that extends first through first side 84 of clamp 80, intermediate load bar 34, and second side 86 of clamp 80. Bolt 92 is fastened in place by a nut 94. A washer 96 may be used between bolt 92 and first side 84 if desired.

Clamp 80 is attached to first or second elongate side member 16 or 18 of rack 10 by first removing clamp 80 from the end of intermediate load bar 34, separating first side 84 and second side 86, and then placing the clamp over the elongate side member. Clamp 80 may then be reattached to intermediate load bar 34, and secured in a desired position along elongate side members 16 and 18 by tightening bolt 92. When clamp 80 is tightened, the end of intermediate load bar 34 is substantially surrounded by first side 84 and second side 86 of clamp 80, helping to protect the end of intermediate load bar 34 from damage.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A load-bearing frame assembly for coupling to a roof of a vehicle, the vehicle roof having a front and a rear, the load-bearing frame assembly comprising:

a front frame section adapted to be coupled to the vehicle roof toward the front of the vehicle roof, the front frame section including a first connector and a first load bar for supporting a sports equipment mount;

a rear frame section adapted to be coupled to the vehicle roof toward the rear of the vehicle roof, the rear frame section including a second connector complementary to the first connector on the front frame section so that the rear frame section is joinable to the front frame section to form a first, smaller load-bearing frame; and a frame extension section adapted to be coupled to the roof of the vehicle between the front frame section and the rear frame section to form a second, larger load-bearing frame, the frame extension section including a second load bar for supporting a sports equipment mount.

2. The load-bearing frame assembly of claim 1, wherein the frame extension section includes a third connector that is complementary to the first connector, and a fourth connector that is complementary to the second connector, so that the frame extension section is joinable to the front frame section and the rear frame section between the front and rear frame sections.

3. The load-bearing frame assembly of claim 1, wherein the frame extension section includes first and second side members extending in a generally parallel, spaced apart relation in a direction from the front of the roof toward the back of the roof, and wherein the second load bar extends between the first and second side members in a direction generally perpendicular to the first and second side members.

4. The load-bearing frame assembly of claim 3, wherein the second load bar is movably coupled to the first and second side members such that the position of the second load bar is adjustable relative to the front of the roof by moving the second load bar along the first and second side members.

5. The load-bearing frame assembly of claim 4, wherein the second load bar is movably coupled to each of the first and second side members with a slideable clamp such that the clamp may be loosened for moving the second load bar along the side members and tightened to fix the second load bar on the side members.

6. The load-bearing frame assembly of claim 5, wherein the slidable clamp includes a pair of opposing coupling surfaces configured to be coupled to the second load bar, each of the coupling surfaces having opposing ends and being coupled at one end to a clamping portion configured to surround either of the side members and to clamp the surrounded side member when both of the coupling surfaces are tightly coupled to the second load bar.

7. The load-bearing frame assembly of claim 6, wherein the opposing coupling surfaces are coupled to the second load bar with a fastener that extends through each coupling surface and through the second load bar.

8. The load-bearing frame assembly of claim 3, wherein one of the first side member, the second side member and the second load bar has a hollow region, and wherein a plug is positioned wholly within the hollow region to prevent water from entering the hollow region.

9. The load-bearing frame assembly of claim 8, wherein the plug is spherical.

10. The load-bearing frame assembly of claim 8, wherein the plug is made of an elastomeric material.

11. The load-bearing frame assembly of claim 3, wherein a floor member extends between the first and second side members.

12. The load-bearing frame assembly of claim 11, wherein the second load bar is disposed vertically above the floor member.

13. A load-bearing frame assembly for mounting to a roof of a vehicle, the vehicle roof having a front and a rear, the frame assembly comprising:

first and second elongate members configured to extend in parallel spaced relation to one another in a front to back direction along the vehicle roof;

floor member disposed between the first and second elongate members;

a first load bar configured to extend between the first and second elongate members for supporting a sports equipment mount;

a second load bar configured to extend between the first and second elongate members at a location closer to the rear of the vehicle roof than the first load bar for supporting a sports equipment mount;

a plug, wherein at least one of the first elongate member, second elongate member and first load bar has an outer surface and a hollow region, and wherein the plug is configured to fit within the hollow region such that the plug does not extend over the outer surface; and wherein the plug is made of an elastomeric material.

14. The load-bearing frame assembly of claim 13, wherein the hollow region has an inner diameter, wherein the plug has a diameter, and wherein the diameter of the plug is greater than the inner diameter of the hollow region so that the plug is deformed when it is positioned in the hollow region to seal the hollow region.

15. A load-bearing frame assembly for mounting to a roof of a vehicle, the vehicle roof having a front and a rear, the frame assembly comprising:

first and second elongate members configured to extend in parallel spaced relation to one another in a front to back direction along the vehicle roof;

a floor member disposed between the first and second elongate members;

a first load bar configured to extend between the first and second elongate members for supporting a sports equipment mount;

a second load bar configured to extend between the first and second elongate members at a location closer to the rear of the vehicle roof than the first load bar for supporting a sports equipment mount;

a plug, wherein at least one of the first elongate member, second elongate member and first load bar has an outer surface and a hollow region, and wherein the plug is configured to fit within the hollow region such that the plug does not extend over the outer surface; and wherein the second load bar is movably coupled to the first and second elongate members so that the position of the second load bar relative to the first load bar is adjustable.

16. A sports equipment rack adapted for mounting sports equipment to the exterior of a vehicle, comprising:

a frame structure configured to be secured to a vehicle and support a section of sports equipment;

wherein the frame structure includes:

a front frame section adapted to be coupled to the vehicle roof toward the front of the vehicle roof, the front frame section including a first connector;

a rear frame section adapted to be coupled to the vehicle roof toward the rear of the vehicle roof, the rear frame section including a second connector complementary to the first connector on the front frame section so that the rear frame section is joinable to the front frame section to form a first, smaller load-bearing frame; and a frame extension section adapted to be coupled to the roof of the vehicle between the front frame section and the rear frame section to form a second, larger load-bearing frame;

an equipment mounting structure coupled to the frame structure and adapted to selectively receive and secure a section of sports equipment to the frame structure, wherein at least one of the frame structure and mounting structure includes a hollow elongate member with an outer surface;

a sealing member to prevent water from entering and corroding the hollow elongate member, wherein the sealing member is disposed within the hollow elongate member such that the sealing member does not extend over the outer surface of the hollow elongate member; and wherein the equipment mounting structure includes a first load bar coupled to one of the front frame section, the frame extension section and the rear frame extension.

17. The rack of claim 16, wherein the equipment mounting structure includes a second load bar coupled to one of the frame section, frame extension section and rear frame section at a location closer to the rear of the vehicle roof than the first load bar.

18. The rack of claim 17, wherein one of the first and second load bars is movably coupled to one of the front frame section, frame extension section and rear frame section so that the relative positions of the first and second load bars are variable.

19. The sports equipment rack of claim 16, wherein the sealing member is made from an elastomeric material.

20. The sports equipment rack of claim 19, wherein the hollow elongate member has an inner diameter, wherein the sealing member has a diameter, and wherein the diameter of the sealing member is greater than the inner diameter of the hollow elongate member so that the sealing member is deformed when it is positioned in the hollow elongate member to seal the hollow elongate member.

\* \* \* \* \*